(12) United States Patent
Kawazoe et al.

(10) Patent No.: US 8,289,506 B2
(45) Date of Patent: Oct. 16, 2012

(54) LASER WELDING INSPECTION DEVICE

(75) Inventors: Yuji Kawazoe, Toyota (JP); Masahiro Nishio, Toyota (JP); Akihiro Toyoda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 321 days.

(21) Appl. No.: 12/672,839

(22) PCT Filed: Jul. 29, 2008

(86) PCT No.: PCT/JP2008/064069
§ 371 (c)(1),
(2), (4) Date: Feb. 9, 2010

(87) PCT Pub. No.: WO2009/022587
PCT Pub. Date: Feb. 19, 2009

(65) Prior Publication Data
US 2011/0026016 A1 Feb. 3, 2011

(30) Foreign Application Priority Data
Aug. 10, 2007 (JP) ................................. 2007-209481

(51) Int. Cl.
*G01N 21/00* (2006.01)
(52) U.S. Cl. .................................................. 356/237.1

(58) Field of Classification Search .................. None
See application file for complete search history.

(56) References Cited

U.S. PATENT DOCUMENTS 7,420,146 B1 * 9/2008 Spawr ............................ 250/205
2004/0226979 A1 * 11/2004 Sato et al. ........................ 228/41

FOREIGN PATENT DOCUMENTS

| JP | 07-185862 A | 7/1995 |
| JP | 07-301764 A | 11/1995 |
| JP | 11-320144 A | 11/1999 |
| JP | 2000-321528 A | 11/2000 |
| JP | 2004-337874 A | 2/2004 |
| JP | 2009-039779 A | 2/2009 |

* cited by examiner

*Primary Examiner* — Layla Lauchman
*Assistant Examiner* — Amanda Merlino
(74) *Attorney, Agent, or Firm* — Kenyon & Kenyon LLP

(57) ABSTRACT

A first image formation point for a workpiece is provided between a camera and the workpiece. An image of the workpiece is at the first image formation point, and picked up by the camera. Meanwhile, an image for a protection glass is not formed at the first image formation point, and is instead diffused and then picked up by the camera. For this reason, an image caused by dirt on the protection glass is diffused. As a result, in the image picked up by the camera, images due to dirt become few and images due to the workpiece become relatively many. Therefore, the accuracy of an evaluation on the quality of the workpiece can be improved.

3 Claims, 3 Drawing Sheets

LASER WELDING INSPECTION DEVICE

This is a 371 national phase application of PCT/JP2008/064069 filed 29 Jul. 2008, claiming priority to Japanese Patent Application No. 2007-209481 filed 10 Aug. 2007, the contents of which are incorporated herein by reference.

FILED OF THE INVENTION

The present invention relates to a laser welding inspection device that finds out a laser welding condition and inspects welding quality.

BACKGROUND OF THE INVENTION

A device described in Patent Document 1 (hereinafter referred to as the device of Patent Document 1) is an example of a conventional laser welding inspection device. The device of Patent Document 1 is provided with a laser irradiation head that radiates a laser generated by a laser oscillator to a workpiece and welds the workpiece. The laser irradiation head is equipped with a lens (condenser lens) that condenses the laser generated by the laser oscillator and irradiates the laser to the workpiece, and a protective cover that protects the condensing lens from scatterings (evaporated substances contained in the workpiece and the like) generated during the welding. The device of Patent Document 1 is further provided with an optical fiber that is arranged at a position slightly apart from an optical path of the laser irradiated from the laser irradiation head, and a solar battery that is disposed at a position opposite an end of the optical fiber converts light energy into electrical energy (voltage).

According to the device of Patent Document 1, when there are few or no stains or the like on the protective cover, there is little or no scattering of the laser due to stains or the like. As a consequence, a smaller part of the laser irradiates the solar battery and an effective laser is irradiated to the workpiece. However, when there are many stains or the like on the protective cover, more of the laser is scattered by the stains or the like. Thus, much scattered light (laser) is irradiated to the solar battery through the optical fiber and less of the laser is applied to the welding. As a result, an effective laser is not irradiated to the workpiece.

Thus according to the device of Patent Document 1, when there are few or no stains or the like on the protective cover, an effective laser is irradiated to the workpiece and therefore the welding is judged as good. When there are many stains or the like on the protective cover, an effective laser is not irradiated to the workpiece and therefore the welding is judged as poor.
Patent Document 1: Japanese Patent Application Publication No. JP-A-H11-320144

SUMMARY OF THE INVENTION

Problem to be Solved by the Invention

According to the above related art, an optical fiber and a solar battery are provided, and the solar battery is arranged at a position opposite an end of the optical fiber. The solar battery is connected to a harness and an end of the harness is connected to a waveform measuring instrument. In the related art, the harness and the solar battery are adopted for judging the quality of the welding, but these also increase the complexity of the device. Furthermore, the distance that the solar battery is disposed apart from the optical path of the laser increases the size of the device by a corresponding amount. In addition, solar batteries are generally expensive and may lead to a rise in the cost of the device. Improvement of these points is desired.

The present invention was devised in view of the foregoing circumstances, and it is an object of the present invention to provide a laser welding inspection device that can excellently carry out an evaluation of welding quality by suppressing the effect of foreign substances adhered on a protection glass with a simple configuration.

Means for Solving the Problem

A laser welding inspection device according to the present invention comprises: an imaging device which receives reflected laser light that is the irradiation of laser light reflected by a welding portion and which images the welding portion by means of the reflected laser light received; a first lens unit and a second lens unit that are arranged in this order and placed between the welding portion and the imaging device, the first and the second lens units passing at least the reflected laser light between the irradiation and the reflected laser light of the welding portion; and a protection glass that is placed between the first lens unit and the welding portion so as to protect the first and the second lens unit, and the laser welding inspection device inspects welding quality using a welding portion image acquired from the imaging of the imaging device. The laser welding inspection device is characterized in that at least one image formation point for the welding portion is provided between the imaging device and the welding portion such that an image formation point for the protection glass does not coincide with the imaging device, and that the image formation point for the welding portion is provided between the first lens unit and the second lens unit.

According to the present invention, an image of the welding portion is formed at the image formation point for the welding portion, which is provided between the imaging device and the welding portion, and the image of the welding portion is picked up by the imaging device. On the other hand, an image for the protection glass is not formed at the image formation point and is diffused instead. Therefore, in the image acquired by the imaging device, images due to dirt on the protection glass are relatively few, and the accuracy of the quality judgment can be improved accordingly.

Exemplary Forms of the Invention

Hereinafter, exemplary forms of inventions considered claimable in the present application (sometimes referred to as claimable inventions below) will be described. The forms are divided into items similar to the claims, and each item is assigned with a number and may cite the number of other items as necessary. This format is only intended to facilitate understanding of the claimable inventions, and the combinations of structural elements that constitute the claimable inventions are not limited to those described in the following items. In other words, the claimable inventions should be interpreted in consideration of the descriptions accompanying each item, the descriptions of the embodiments, and the like. Forms that add other structural elements to or omit structural elements from the forms in the items are also considered to be forms of the claimable inventions, provided that they conform to such interpretations.

The present invention is constituted by the forms in the following items (1) to (5). The forms in items (1) to (3) correspond to the claims 1 to 3, respectively.

(1) A laser welding inspection device comprises: an imaging device which receives reflected laser light that is the irradiation of laser light reflected by a welding portion by means of the reflected laser light received; a first lens unit and a second lens unit that are arranged in this order and placed between the welding portion and the imaging device, the first and the second lens units passing at least the reflected laser light between the irradiation and the reflected laser light of the welding portion; and a protection glass that is placed between the first lens unit and the welding portion so as to protect the first and the second lens unit, the laser welding inspection device inspects welding quality using a welding portion image acquired from the imaging of the imaging device, wherein at least one image formation point for the welding portion is provided between the imaging device and the welding portion such that an image formation point for the protection glass does not coincide with the imaging device, and the image formation point for the welding portion is provided between the first lens unit and the second lens unit.

(2) The laser welding inspection device according to item (1) is characterized in that a diaphragm that limits a direction range of a light beam incident from the protection glass is provided between the imaging device and the protection glass.

(3) The laser welding inspection device according to item (2) is characterized in that the image formation point for the welding portion is arranged at a position equivalent to that of the diaphragm.

(4) The laser welding inspection device according to any one of items (1) to (3) is characterized in that a distance between a lens opposing the protection glass in the optical system of the laser (hereinafter referred to as a protection glass opposing lens) and the welding portion (hereinafter referred to as a protection glass opposing lens-welding portion distance) is a, and a distance between the protection glass opposing lens and the protection glass (hereinafter referred to as a protection glass opposing lens-protection glass distance) is b, and a/b is equal to or greater than a value t that exceeds 1 (i.e., t>1).

(5) The laser welding inspection device according to item (4) is characterized in that the value t exceeding 1 is equal to 10.

According to the laser welding inspection device described in items (1) to (5), an image of the welding portion is formed at the image formation point for the welding portion, which is provided between the imaging device and the welding portion, and picked up by the imaging device. Meanwhile, an image for the protection glass is not formed at the image formation point, and is instead diffused and then picked up by the imaging device. For this reason, an image caused by dirt on the protection glass is diffused. Alternatively, a diaphragm may be provided. Thus, in the image acquired by the imaging device, image components due to dirt become unclear and few, and image components due to the welding portion become clear and many. Therefore, the accuracy of a quality judgment can be improved accordingly.

Effects of the Invention

According to the invention of claim 1, an image of the welding portion is formed at the image formation point for the welding portion, which is provided between the imaging device and the welding portion, and picked up by the imaging device. Meanwhile, an image for the protection glass is not formed at the image formation point, and is instead diffused. Therefore, in the image acquired by the imaging device, images due to dirt on the protection glass become relatively few, and the accuracy of a quality judgment can be improved accordingly.

According to the invention of claim 2, image components caused by dirt on the protection glass become few, and image components due to the welding portion become many. Therefore, the accuracy of the quality judgment can be improved.

According to the invention of claim 3, the image formation point for the welding portion and the diaphragm are arranged at equivalent positions. Therefore, the effect of the diaphragm on the image components due to the welding portion becomes small, and the accuracy of the quality judgment can be improved accordingly.

Figure 1:
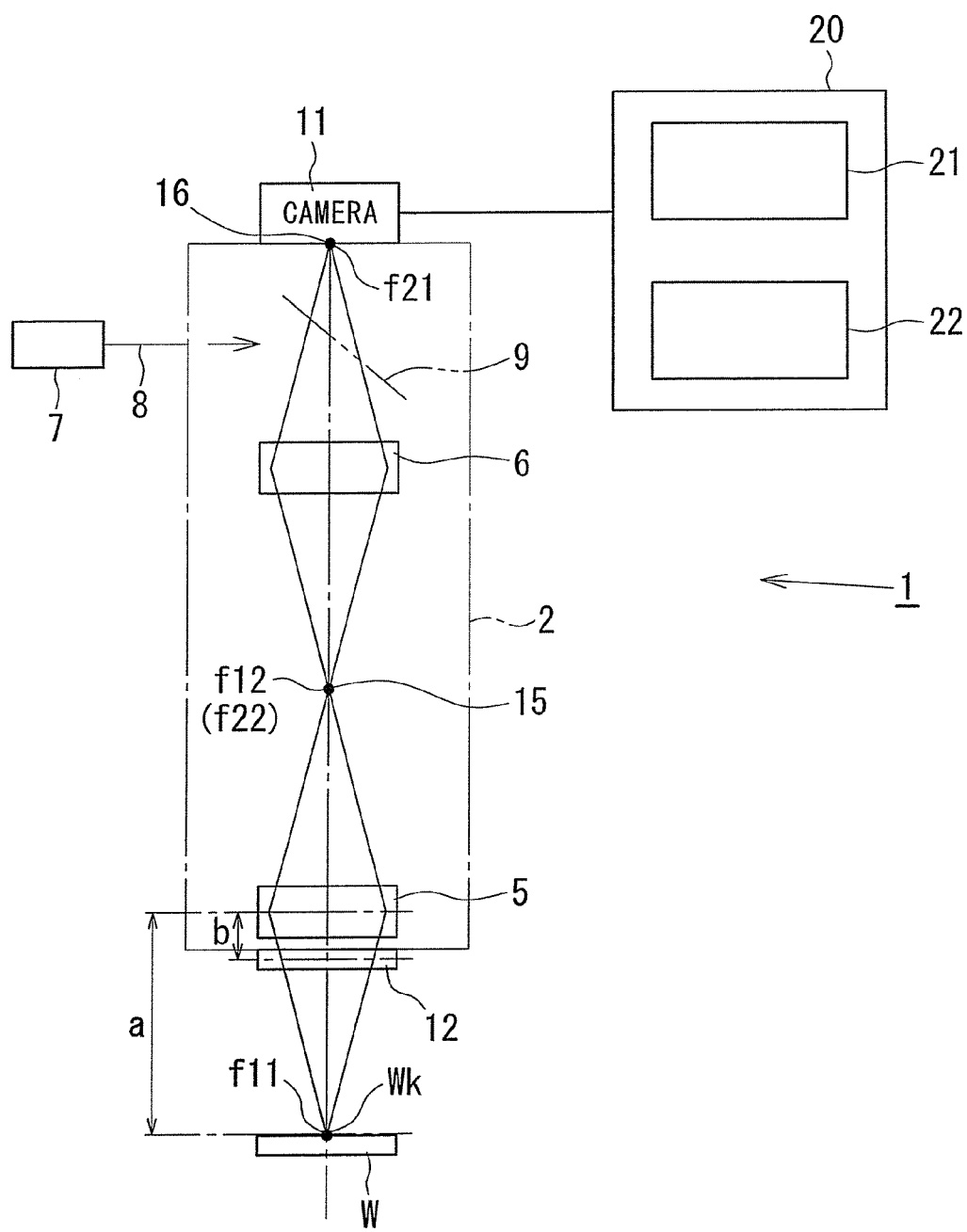
FIG. 1 is a schematic drawing that shows a laser welding inspection device according to a first embodiment of the present invention.

DESCRIPTION OF THE REFERENCE NUMERALS 1, 1A, 1B laser welding inspection device
5, 6 first, second lens unit
11 camera (imaging means)
12 protection glass
15 first image formation point (image formation point for welding portion)
30 diaphragm
W workpiece (welding portion)

DETAILED DESCRIPTION

A first embodiment of the present invention will be described below with reference to FIGS. 1 and 2.

FIG. 1 shows a laser welding inspection device 1 according to the first embodiment of the present invention. In the figure, reference numeral 2 denotes a welding torch, and two lens units 5, 6 are built into the welding torch 2. The welding torch 2 is designed such that laser light (laser light for welding) is sent from a laser oscillator 7 through an optical fiber 8 and passes through the two lens units 5, 6 via a mirror 9. The laser light is then irradiated toward a workpiece (welding portion) W such that laser welding is carried out on the workpiece W. The mirror 9 reflects a laser light beam, while an image (visible light) is transmitted so as to an image that is picked up by a camera 11 described later.

A protection glass 12 is provided on a front end portion of the welding torch 2. The protection glass 12 is designed to protect the two lens units, that is, the two lens units 5, 6, from spatter (scatterings of molten metal) and fumes (smoky gases) generated by the laser welding. Hereinafter, a portion among the two lens units 5, 6 that is arranged on the front end portion side of the welding torch 2 will be referred to as a first lens unit 5, and a portion among the two lens units 5, 6 that is arranged on a rear end portion side of the welding torch 2 will be referred to as a second lens unit 6 for convenience.

A camera 11 is disposed at the rear end portion of the welding torch 2. Reflected laser light that is reflected off the workpiece W passes through the first and second lens units 5, 6 so that the camera 11 receives such light on the same optical axis as the laser light for welding.

The welding torch 2 is positioned such that a focal point f11 of the first lens unit 5 coincides with a work point Wk of the workpiece W and a focal point f21 of the second lens unit 6 coincides with the camera 11. The first and second lens units 5, 6 are also set such that another focal point f12 of the first lens unit 5 and another focal point f22 of the second lens unit 6 are at equivalent positions (hereinafter referred to as a focal point coincident position 15 of the first and second lens units 5, 6). By arranging the first and second lens units 5, 6 as described above and positioning the welding torch 2 with respect to the camera 11 and the workpiece W as described above, the welding torch 2 forms an image for the workpiece W at the focal point coincident position 15 of the first and second lens units 5, 6. The focal point coincident position 15 of the first and second lens units 5, 6 where the image for the workpiece W is thus fixated will be referred to hereinafter as a first image formation point 15 (that is equivalent to an image formation point for the welding portion of claim 1) as appropriate. Furthermore, by positioning the welding torch 2 with respect to the camera 11 and the workpiece W as described above, the camera 11 picks up an image (forms an image) via the first image formation point 15 for the workpiece W. This image formation point of the camera 11 will be hereinafter as a second image formation point 16 for convenience.

A distance between the first lens unit 5 and the work point Wk of the workpiece W (a first lens unit-workpiece distance), that is, a focal point distance of the first lens unit 5 is a, and a distance between the first lens unit 5 and the protection glass 12 (a first lens unit-protection glass distance) is b. The two distances have the relationship of $a/b \geq 110$.

The camera 11 uses the reflected laser light received through the first and second lens units 5, 6 to pick up an image of the workpiece W (work point Wk of the workpiece W), and acquires a welding portion image that is an image (visible image) of the workpiece W. In general, the repetition of laser welding causes spatter or the like (hereinafter referred to as dirt for convenience) to adhere to the protection glass 12 as described above. When dirt adheres to the protection glass 12, images caused by the dirt (hereinafter referred to as images due to dirt) are included in the welding portion image.

A signal processing device 20 is separately provided. The signal processing device 20 includes image analysis means 21 for analyzing an image picked up by the camera 11, and quality judgment means 22 for judging the welding quality of the workpiece W based on the analysis results of the image analysis means 21.

In the laser welding inspection device 1 with the above configuration, the first lens unit-workpiece distance a and the first lens unit-protection glass distance b are set as described above ($a/b \geq 10$), and the first image formation point 15 is disposed between the camera 11 and the workpiece W. Thus, the image for the protection glass 12 does not form at the first image formation point 15, and as shown by a dashed line 23 in FIG. 2, the image is formed at a portion more toward the second lens unit 6 side than the first image formation point 15 (a portion hereinafter referred to as a protection glass-intended image formation point 26). The image formed at the protection glass-intended image formation point 26 is not formed on the camera 11, the image is instead diffused and then picked up by the camera 11.

Figure 2:
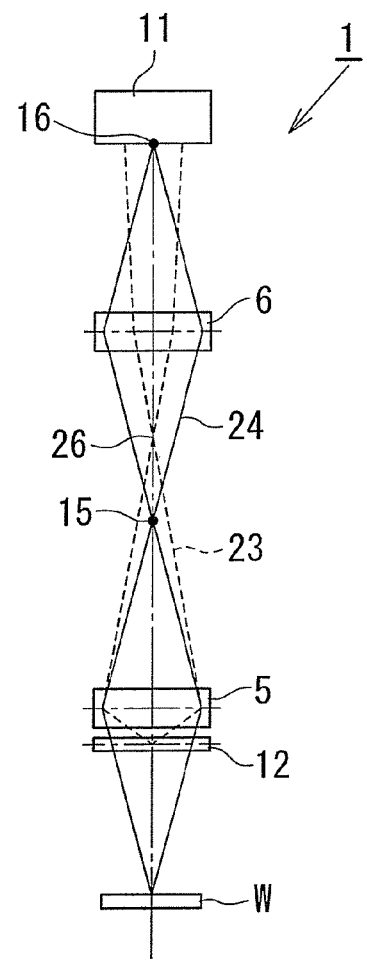
FIG. 2 is a drawing that shows optical paths of light from a workpiece and a protection glass of FIG. 1.

Meanwhile, the image for the workpiece W is formed at the first image formation point 15, and as shown by a solid line 24 in FIG. 2, picked up at the second image formation point 16, i.e., by the camera 11.

Therefore, the image caused by dirt on the protection glass 12 is diffused. Consequently, in the welding portion image, the effect of the image due to dirt is relatively small and the image due to the workpiece W becomes clearer. This in turn raises the accuracy of the quality judgment by a corresponding amount, which enables an excellent evaluation of the welding quality of the workpiece W.

In the related art above, where a solar battery is arranged at a position opposite an end of an optical fiber and a harness is connected to the solar battery, the use of the solar battery can lead to greater complexity of the device and a higher device cost. On the contrary, adjusting the lens arrangement to evaluate the welding quality of the workpiece W eliminates the need for the solar battery required by the related art, thus achieving a simpler configuration and a less expensive device.

According to the above embodiment, the first lens unit-workpiece distance a and the first lens unit-protection glass distance b are set as $a/b \geq 10$. Consequently, the protection glass 12 is farther apart from the workpiece W than when $a/b < 10$, whereby the adherence of spatter or the like to the protection glass 12 is suppressed by a corresponding amount.

Note that the first lens unit-workpiece distance a and the first lens unit-protection glass distance b may be set as $a/b \geq t$ (where, $t > 1$), instead of $a/b \geq 10$ as described above.

In the above embodiment, as an example, one image formation point for the workpiece W is provided between the camera 11 and the workpiece W. However, the present invention is not limited to this example, and a lens unit may be further provided so that two or more image formation points for the workpiece W are provided between the camera 11 and the workpiece W. In such case, in addition to the above layout, an image formation point for the protection glass 12 is set so as not to coincide with the camera 11.

Figure 3:
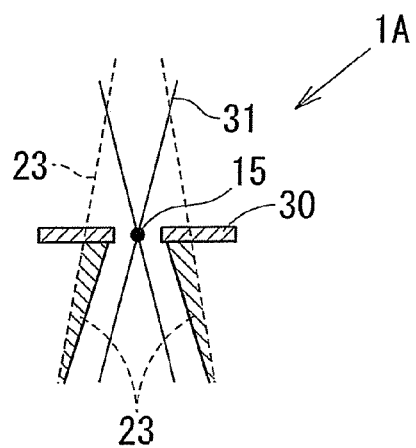
FIG. 3 is a drawing that shows an example (a second embodiment) in which the laser welding inspection device of FIG. 1 is provided with a diaphragm.

As shown in FIG. 3, in the above embodiment, a diaphragm 30 may be provided that limits a direction range of a light beam incident to the first image formation point 15 from the protection glass 12 (see FIG. 1) (a second embodiment).

In a laser welding inspection device 1B according to the second embodiment, the diaphragm 30 is provided to suppress the advancement of light in a region 23a, which is indicated by hatching in FIG. 3 among an image (image due to dirt or the like) 23, from the protection glass 12 toward the camera 11 side. An image component due to dirt is thus reduced.

Meanwhile, the image from the workpiece W (see FIG. 1), as shown by a solid line 31 in FIG. 3, is not restricted by the diaphragm 30 and advances toward the camera 11 (see FIG. 1) side. As a consequence, in the welding portion image, the image components due to dirt become relatively few and the image components due to the workpiece W become many. Therefore, the accuracy of the quality judgment can be improved accordingly.

In the second embodiment, as an example, the diaphragm 30 is provided at the first image formation point 15. However, the diaphragm 30 may be provided at a position apart from the first image formation point 15.

According to the first and second embodiments, as an example, the laser irradiation direction and the imaging direction of the camera 11 share the same axis. However, the present invention is not limited to this example.

Figure 4:
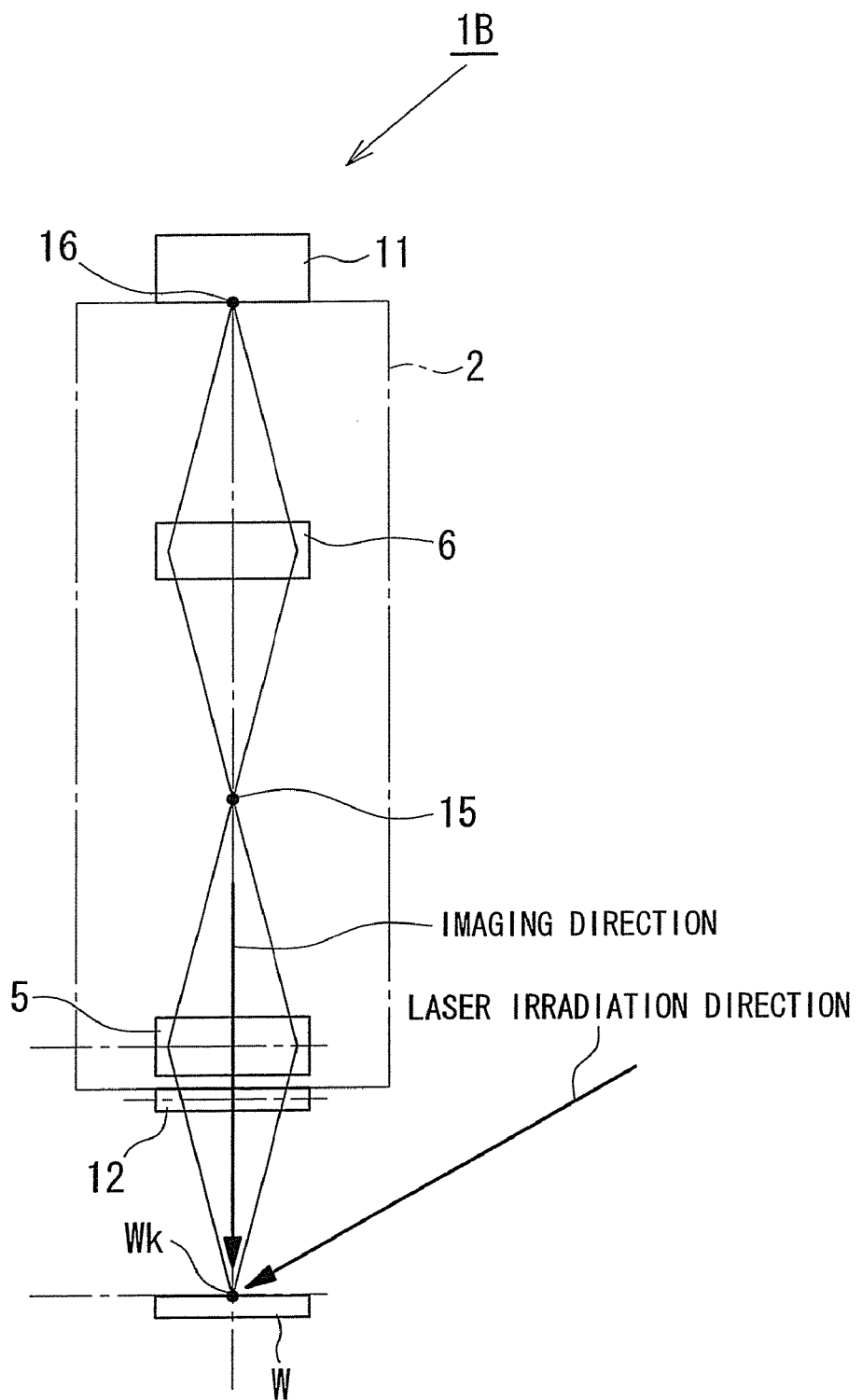
FIG. 4 is a schematic drawing that shows a laser welding inspection device 1 according to a third embodiment of the present invention.

For example, as shown in FIG. 4, imaging by the camera 11 may be performed in a direction orthogonal to the surface of the workpiece W, similar to the first and second embodiments, while laser irradiation may be performed at an incident angle of approximately 60 degrees with respect to the workpiece W. The laser welding inspection device 1B in FIG. 4 shows an example in which the incident angle of laser irradiation is approximately 60 degrees, however, laser irradiation may be performed at a different incident angle.

The invention claimed is:

1. A laser welding inspection device comprising:
   an imaging device which receives reflected laser light that is the irradiation of laser light reflected by a welding portion and which images the welding portion by means of the reflected laser light received;
   a first lens unit and a second lens unit that are arranged in this order and placed between the welding portion and the imaging device, the first and the second lens units passing at least the reflected laser light between the irradiation and the reflected laser light of the welding portion; and
   a protection glass that is placed between the first lens unit and the welding portion so as to protect the first and the second lens unit, the laser welding inspection device inspecting welding quality using a welding portion image acquired from the imaging of the imaging device,
   a diaphragm between the imaging device and the protection glass that limits a direction range of a light beam incident from the protection glass;
   wherein a first image formation point corresponding to the welding portion is placed between the first and second lens units; and
   a protection glass-intended image formation point corresponding to the protection glass is placed between the first image formation point and the second lens unit, whereby the imaging device is not adapted to pick up the protection glass-intended image formation point so as to diffuse images of dirt on the protection glass.

2. The laser welding inspection device according to claim 1, wherein
   the first image formation point for the welding portion is arranged at a position equivalent to that of the diaphragm.

3. The laser welding inspection device according to claim 1, further comprising a lens unit between the welding portion and the imaging device so as to provide at least two image formation points for each of the first image formation point and the protection glass-intended image formation point.

* * * * *

UNITED STATES PATENT AND TRADEMARK OFFICE
CERTIFICATE OF CORRECTION

PATENT NO. : 8,289,506 B2  
APPLICATION NO. : 12/672839  
DATED : October 16, 2012  
INVENTOR(S) : Yuji Kawazoe et al.

It is certified that error appears in the above-identified patent and that said Letters Patent is hereby corrected as shown below:

On the Title Page, Item (57) Abstract, change "piece is at the first" to --piece is formed at the first--;

In the Specifications:

Column 5, line 19, change "is thus fixated" to --is thus formed--;

Column 5, line 33, change "a/b ≥110" to --a/b≥10--.

Signed and Sealed this  
Fourteenth Day of May, 2013

Teresa Stanek Rea  
*Acting Director of the United States Patent and Trademark Office*